Patented Dec. 7, 1948

2,455,540

UNITED STATES PATENT OFFICE 2,455,540

FLEXIBLE WRINKLE FINISH AND PROCESS OF MAKING

William A. Waldie, Oakwood, Ohio, assignor to New Wrinkle, Inc., Wilmington, Del., a corporation of Delaware No Drawing. Application December 11, 1944, Serial No. 567,791

13 Claims. (Cl. 117—41)

This invention relates to wrinkle finishes with particular reference to wrinkle finishes for coating fabrics to form oil cloth type materials, and also relates to the methods of producing such finishes and such coated fabrics and to the coated fabrics produced thereby.

Coating materials for producing wrinkle finish oil cloth and similar fabrics heretofore have been made from a mixture of China-wood oil and soya bean or fish oil, together with a drier catalyst, drier pigment and thinner. The oil mixture was usually heated in two batches, one being heated for several hours, the other batch being cooled immediately and the two batches of different viscosity thus obtained were then mixed together.

It was furthermore considered necessary heretofore to carry out the baking of the fabric with the coating material in two steps in order to obtain a distinct and uniform wrinkle finish. This heating in two batches and the baking in two steps made the processes relatively expensive, and a new method was therefore developed in which the two-step procedures are replaced by one single step without impairing the quality of the wrinkle finish.

Besides, in the method of this invention, the very expensive and scarce China-wood and soya bean oils have been replaced by castor oil, which is considerably cheaper and available from domestic sources. The use of fish oil which also has been recommended, has the disadvantage that the finishes obtained from it show a very non-uniform texture and it therefore is not being used either in the new compositions of my invention. It therefore is one object of my invention to produce wrinkle finishes and oil cloth materials with them which are relatively inexpensive and the raw materials for which are available from domestic sources.

Another object of this invention is the production of wrinkle finish compositions and of oil cloth materials therefrom with the least possible expenditure of labor.

Another object of this invention is the production of wrinkle finishes and of oil cloth materials therefrom which have a high degree of flexibility and the texture of which is uniform.

Still another object of this invention is the production of wrinkle finishes the viscosity of which may be controlled easily and which therefore show a negligibly slight tendency for gelation.

Other and further objects will appear from the more detailed description set forth below, it being understood, however, that this more detailed description is given by way of illustration only and not by way of limitation since various changes in this disclosure may be made by those skilled in the art without departing from the scope and spirit of this invention.

In the production of wrinkle coatings in accordance with the present invention, a mixture of raw and dehydrated castor oil is used together with the usual drier catalyst and a pigment paste.

Suitable drier catalysts are red lead, litharge, cobalt acetate or a mixture thereof, the finishes made with only cobalt acetate having the lightest and those made with red lead having the darkest color.

The pigment paste may comprise inorganic as well as organic pigments, such as chrome green, chrome yellow, iron oxides and azo pigments such as toluidine toner. It was found that all colored pigments are suitable for the products and processes of my invention.

The following example serves to illustrate a wrinkle finish composition, which is made from castor oil only, and its use for the manufacture of oil cloth.

*Example*

In the first step of the process a flexible oil was produced by mixing 24 gallons of Castung oil #103 and 12 gallons of raw castor oil and heating this mixture to 450° F. Then a mixture of 2.5 pounds of red lead and 2.5 pounds litharge was added to the hot oil mixture under stirring. Then the temperature was raised to 540° F. and held at between 540 and 550° F. for two hours when a viscosity of 130 to 140 poises was reached. The oil was of a very dark, practically black color.

In a separate step the pigment paste was prepared from 16 pounds of toluidine toner and 32 pounds of a reduced oil made from three volumes of raw castor oil and one volume of xylol. Eight pounds of this toluidine paste were added to four gallons of the flexible oil produced in the first step. This mixture was then applied to fabric material and the coating allowed to dry at room temperature for fifteen minutes; it then was baked in a gas oven at 200° F. for two hours. A very flexible coating of uniform wrinkle texture was obtained.

Castung oil #103 is a dehydrated castor oil sold by Baker Castor Company, New York.

The heating temperatures in the above example may be varied according to the degree of fineness desired in the wrinkle texture, higher cooking temperatures yielding a finer texture than lower ones. Likewise, the periods of time for which the compositions are heated have a bearing on the wrinkle texture, shorter heating times producing finer wrinkles than longer heating times. Temperatures of from 410 to 480° F. have been found suitable for the beginning, and temperatures of from 520-570° F. for the final heating of the oil upon addition of the drier catalyst. The final heating may be carried out for a period of time of from 1 to 3 hours according to the viscosity of the mixture and the texture of the coating desired.

For the preparation of the pigment any oil other than castor oil may be used. Linseed oil, for example, or cottonseed oil have given satisfactory results. Likewise, the xylol may be replaced partly or wholly by other powerful solvents, such as toluol, light gravity petroleum naphtha and other solvents known to every one skilled in the art.

The proportion by volume of dehydrated castor oil to raw castor oil may range from 3:1 to 1:1. In the example the ratio used is 2:1.

The coated fabric may be air dried prior to baking for a period of from 10 to 30 minutes. Baking may be carried out by any method known to every one skilled in the art. Infrared drying, for example, has also given satisfactory results. Application of baking temperatures of from 150° to 205° F. for a period of time of from 1-3 hours has been found suitable.

It will be readily seen from the above that the entire quantity of oil is heated in one single batch, and yet, in contradistinction to the opinion heretofore common among those skilled in the art a very satisfactory wrinkle finish is obtained. Heretofore it was considered necessary to produce two batches of oil of different viscosities in order to obtain the desired wrinkle finish. This distinction of this process from prior methods represents a considerable economic advantage, the heat, labor and time required being reduced. However, if desired, my wrinkle finish may also be produced by the process hitherto used, and the oil may be heated in two different batches without impairing the quality of the product obtained. Likewise, the baking procedure is simpler and consequently less expensive in my new process as compared with that used heretofore in the art. Heretofore baking had to be carried out in two stages in order to obtain satisfactory wrinkle texture. In the process of my invention, the first stage of baking has been replaced by a short period of air drying which also means an advantage from the economic point of view.

Heretofore it was also considered necessary to add a stabilizer compound to pigment containing wrinkle finishes in order to counteract the deleterious influence of the pigment on the uniformity of the wrinkle texture. It has been discovered that according to the present invention the wrinkle texture may be controlled entirely satisfactorily by the selection of the proper cooking temperatures, and that the properties of the castor oil are not disadvantageously affected by the presence of pigment. However, if desired, stabilizer compounds may be added instead or in addition to varying the cooking temperatures without departing from the spirit and scope of my invention.

The texture of the wrinkle finish of my invention may be furthermore modified by the addition of an inert paste containing asbestine or diatomaceous earth or other inert pigments. Such texture modifiers have been disclosed in my Patent No. 2,275,239, patented March 3, 1942.

The coating compositions of this invention may be used for all kinds of materials such as metal, wood, fabric, rubber. However, on account of the high degree of flexibility, the composition of my invention is particularly well suited for application on fabric and manufacture of oil cloth and similar materials.

It is desired to comprehend within my invention such modifications as may adapt it to varying conditions of use.

Having thus set forth my invention, I claim:

1. A resin-free wrinkle finish composition consisting substantially of the heat reaction product of a mixture of raw castor oil and dehydrated castor oil, said dehydrated castor oil being used in at least the same amount as said raw castor oil and said mixture being heated to a temperature of from 410 to 480° F.; a drier catalyst; and a pigment paste; said heat reaction product being obtained by heating said ingredients to a temperature of from 520 to 570° F. for 1 to 3 hours.

2. A resin-free wrinkle finish composition consisting only of the heat reaction product of a mixture of raw castor oil and dehydrated castor oil in the proportion by volume of from 1:3 to 1:1, said mixture being heated to a temperature of from 410 to 480° F.; a drier catalyst; and a pigment paste; said heat reaction product being obtained by heating said ingredients to a temperature of from 520 to 570° F. for 1 to 3 hours.

3. A resin-free wrinkle finish composition consisting substantially only of the heat reaction product of a mixture of raw castor oil and dehydrated castor oil, said dehydrated castor oil being used in at least the same amount as said raw castor oil and said mixture being heated to a temperature of from 410 to 480° F.; red lead; litharge; and pigment paste; said heat reaction product being obtained by heating said ingredients to a temperature of from 520 to 570° F. for 1 to 3 hours.

4. A resin-free wrinkle finish composition according to claim 1, in which the pigment paste consists of a pigment, oil and thinner.

5. A resin-free wrinkle finish composition consisting substantially of the heat reaction product of a mixture of raw castor oil and dehydrated castor oil, said dehydrated castor oil being used in at least the same amount as said raw castor oil and said mixture being heated to a temperature of from 410 to 480° F.; drier catalyst; pigment paste; and a texture modifying compound which is based on an inert pigment; said heat reaction product being obtained by heating said ingredients to a temperature of from 520 to 570° F. for 1 to 3 hours.

6. A method of producing a resin-free wrinkle finish composition consisting substantially of mixing and heating dehydrated castor oil and raw castor oil together to approximately 450° F., said dehydrated castor oil being used in at least the same amount as said raw castor oil; adding a drier catalyst material thereto; raising the temperature; and heating the mixture to 540 to 550° F. until the desired viscosity is obtained, and then adding a pigment paste.

7. A method of producing a resin-free wrinkle finish composition consisting of mixing dehydrated castor oil and raw castor oil; said dehydrated castor oil being used in at least the same amount as said raw castor oil; heating the mixture to a temperature of approximately from 410 to 480° F.; adding a drier catalyst material;

raising the temperature to 520 to 570° F. and holding it for a period of time of from substantially 1 to 3 hours; and then adding pigment paste.

8. A method of producing a resin-free wrinkle finish oil cloth material consisting in heating a mixture of raw castor oil and at least the equal amount of dehydrated castor oil to a temperature of from 410 to 480° F.; adding drier catalyst; raising the temperature to 520 to 570° F. and maintaining it there until the desired viscosity is obtained; mixing a pigment paste and applying said material obtained on a fabric base; and thereafter allowing said fabric to air-dry; and then subjecting it to baking temperatures.

9. A method of producing a resin-free wrinkle finish oil cloth material consisting in heating a mixture of raw castor oil and at least the equal amount of dehydrated castor oil to a temperature of from 410 to 480° F.; adding drier catalyst; raising the temperature to 520 to 570° F. and maintaining it there until the desired viscosity is obtained; mixing a pigment paste and applying said material obtained on a fabric base; and thereafter allowing said fabric to air-dry for 10 to 30 minutes; and then baking it for 1 to 3 hours at a temperature of from 150 to 205° F.

10. A method of producing a resin-free wrinkle finish oil cloth material consisting in heating a mixture of raw castor oil and at least the equal amount of dehydrated castor oil to a temperature of from 410 to 480° F.; adding drier catalyst; raising the temperature to 520 to 570° F. and maintaining it there until the desired viscosity is obtained; mixing a pigment paste and applying said material obtained on a fabric base; and thereafter allowing said fabric to air-dry for 10 to 30 minutes; and then subjecting it to infrared heat.

11. A resin-free oil cloth consisting of a fabric base and a wrinkle textured coating, said cloth consisting of the product resulting from heating a mixture of raw castor oil and at least the equal amount of dehydrated castor oil to a temperature of from 410° to 480° F., adding a drier catalyst material thereto, raising the temperature of said mixture and drier catalyst to from 520° to 570° F. and maintaining it at said temperature until the desired viscosity is obtained; adding a pigment paste and applying said material obtained on a fabric base; and thereafter air drying said fabric and subjecting said dried fabric to baking temperatures.

12. A resin-free oil cloth consisting of a fabric base and a wrinkle textured coating, said cloth consisting of the product resulting from heating a mixture of raw castor oil and at least the equal amount of dehydrated castor oil to a temperature of from 410° to 480° F., adding a drier catalyst material thereto, raising the temperature of said mixture and drier catalyst to from 520° to 570° F. and maintaining it at said temperature until the desired viscosity is obtained; adding a pigment paste and applying said material obtained on a fabric base; and thereafter air drying said fabric for 10 to 30 minutes and subjecting said dried fabric to baking temperatures of from 150° to 205° F. for 1 to 3 hours.

13. A resin-free oil cloth consisting of a fabric base and a wrinkle textured coating, said cloth consisting of the product resulting from heating a mixture of raw castor oil and at least the equal amount of dehydrated castor oil to a temperature of from 410° to 480° F., adding a drier catalyst material thereto, raising the temperature of said mixture and drier catalyst to from 520° to 570° F. and maintaining it at said temperature until the desired viscosity is obtained; adding a pigment paste and applying said material obtained on a fabric base; and thereafter air drying said fabric for 10 to 30 minutes and subjecting said dried fabric to infrared heat.

WILLIAM A. WALDIE.

REFERENCES CITED

The following references are of record in the file of this patent:

UNITED STATES PATENTS

| Number | Name | Date |
|---|---|---|
| 1,950,417 | Root | Mar. 13, 1934 |
| 2,194,988 | Schulein | Mar. 26, 1940 |
| 2,373,177 | Drummond | Apr. 10, 1945 |

FOREIGN PATENTS

| Number | Country | Date |
|---|---|---|
| 523,527 | Great Britain | July 16, 1940 |

OTHER REFERENCES

New Wrinkles in Finishing, publ. by New Wrinkles, Inc., 1940, vol. 4, No. 4, 7 pages.

Protective & Decorative Coatings, Mattiello, vol. 1, 1941, John Wiley & Sons page 134.